US009672467B2

(12) United States Patent
Gilbert

(10) Patent No.: US 9,672,467 B2
(45) Date of Patent: Jun. 6, 2017

(54) SYSTEMS AND METHODS FOR CREATING AND IMPLEMENTING AN ARTIFICIALLY INTELLIGENT AGENT OR SYSTEM

(71) Applicant: RISOFTDEV, Inc., Moraga, CA (US)

(72) Inventor: Vincent Logan Gilbert, Yachats, OR (US)

(73) Assignee: RISOFTDEV, INC., Moraga, CA (US)

(*) Notice: Subject to any disclaimer, the term of this patent is extended or adjusted under 35 U.S.C. 154(b) by 284 days.

(21) Appl. No.: 14/324,144

(22) Filed: Jul. 4, 2014

(65) Prior Publication Data

US 2015/0012464 A1 Jan. 8, 2015

Related U.S. Application Data

(60) Provisional application No. 61/843,230, filed on Jul. 5, 2013.

(51) Int. Cl.
*G06N 5/02* (2006.01)
(52) U.S. Cl.
CPC .................. *G06N 5/02* (2013.01)
(58) Field of Classification Search
CPC .................................... G06N 99/005
USPC ................................................ 706/46
See application file for complete search history.

(56) References Cited

U.S. PATENT DOCUMENTS

| 2010/0088262 A1 | 4/2010 | Visel et al. |
| 2012/0330874 A1 | 12/2012 | Jerram et al. |
| 2013/0080366 A1 | 3/2013 | Bridges et al. |

OTHER PUBLICATIONS

Horzyk et al ("An Intelligent Internet Shop-Assistant Recognizing a Customer Personality for Improving Man-Machine Interactions" 2009).*
Kiselev et al ("Toward incorporating emotions with rationality into a communicative virtual agent" 2010).*

* cited by examiner

*Primary Examiner* — Lut Wong
(74) *Attorney, Agent, or Firm* — Barlow, Josephs & Holmes, Ltd.

(57) ABSTRACT

A system and associated methods for creating and implementing an artificially intelligent agent or system are disclosed. In at least one embodiment, a target personality is implemented in memory on an at least one computing device and configured for responding to an at least one conversational input received from an at least one communicating entity. An at least one conversational personality is configured for conversing with the target personality as needed in order to provide the target personality with appropriate knowledge and responses. For each conversational input received by the target personality, it is first processed to derive an at least one core meaning associated therewith. An appropriate raw response is determined then formatted before being transmitted to the communicating entity. Thus, the target personality is capable of carrying on a conversation, even if some responses provided by the target personality are obtained from the at least one conversational personality.

16 Claims, 7 Drawing Sheets

SYSTEMS AND METHODS FOR CREATING AND IMPLEMENTING AN ARTIFICIALLY INTELLIGENT AGENT OR SYSTEM

RELATED APPLICATIONS

This application claims priority and is entitled to the filing date of U.S. provisional application Ser. No. 61/843,230, filed on Jul. 5, 2013 and entitled "SYSTEMS AND METHODS FOR CREATING AND IMPLEMENTING AN ARTIFICIALLY INTELLIGENT COMPUTER PERSONALITY." The contents of the aforementioned application are incorporated by reference herein.

BACKGROUND

The subject of this patent application relates generally to artificial intelligence, and more particularly to systems and methods for creating and implementing an artificially intelligent agent or system.

By way of background, since the development of the computer, human beings have sought to construct computers that are capable of thinking, learning and carrying on intelligent conversations with humans—in other words, "artificial intelligence." Some development of such artificially intelligent computers has focused on developing computers that are capable of conversing. Thus, a key area in developing an artificially intelligent computer has been developing a language that allows a computer to process inputs received from humans and to respond with an appropriate and cogent output. One such language is known as Artificial Intelligence Markup Language ("AIML").

AIML is interpreted and processed by an AIML interpreter, such as Artificial Linguistic Internet Computer Entity ("ALICE"). The AIML interpreter is designed to receive an input from a user and determine the correct response using knowledge encoded in AIML and stored in an AIML knowledge base. In arriving at a response for a particular input, the AIML interpreter searches a list of categories within the AIML knowledge base. Each category contains a pattern that is linked to a single response template. The AIML interpreter matches the user input against the available patterns in the AIML knowledge base. After finding a match in a pattern, the pattern's corresponding response template is activated and a series of actions are carried out by the AIML interpreter.

The known prior art methods for creating such a computer personality generally consist of manually creating and editing that knowledge base and associated response templates (often referred to as "question-response pairs" or "QR pairs"). As such, the process of creating a computer personality having a relatively high level of artificial intelligence can be very labor intensive and can take thousands or even tens of thousands of hours in order to form a believable personality. Furthermore, depending on the particular context in which a given computer personality is to be utilized (i.e., in the medical field, engineering field, general consumer field, etc.), each discrete computer personality may require a unique set of QR pairs. Thus, there is a need for systems and methods for automating the process of creating an artificially intelligent computer personality that is tailored for a desired context.

There are many type of artificial neural networks known in the prior art. Forward passing neural networks faced the problem of not being able to handle XOR logic problems. Later back propagating networks were developed. Recently a problem which relates to all of these inventions has emerged in the form of a blind spot.

Additionally, among the drawbacks found in many prior art systems is a dependence upon grammar and punctuation in order to recognize elements within a sentence. This presents an insurmountable drawback when attempting to adapt these systems to environments where voice recognition rather than text is the input device. Other problems that exist in systems representative of the current art include a lack of flexibility. Because these systems are issued as standards, they are rigid for the time period that a particular version is operational. This makes it very difficult for them to be adapted to changing technological environments as they are encountered. Implementing upgrades involves issuing a new version which gives rise to versioning problems and very often necessitates entire systems being forced to come offline while they are being adapted to a newer version. Other problems include object representation and the need for a simple way to represent any object known or unknown which might be encountered by an artificially intelligent agent or system.

Many attempts to create a standardized object representation format are known in the prior art. One of the more prominent of these is OWL. All of them have a problem which has sparked one of the more rigorous debates in the field of artificial intelligence: Is an artificially intelligent agent or system truly intelligent, or is its intelligence just an extension of the programmer's intelligence? To some degree they attempt to identify objects and store them according to a pre-determined classification set. This gives any artificially intelligent agent or system using the ontology what is necessarily a view of the world as seen through the eyes of the programmer which created the classification, and further any artificially intelligent agent or system using the ontology would have the same view.

Furthermore, in the context of artificially intelligent systems designed for personal use, such as on smart phones and other mobile devices, such prior art systems typically suffer various drawbacks including limited or no protection for personal data which would include a perceived lack of controllability by the user of how personal data is used by the company hosting the artificial intelligence. There have been numerous attempts to secure personal data that is acquired, stored and later accessed by an artificially intelligent agent or system functioning as a personal agent. To date all of these have failed to some degree. Another notable problem is that when multiple users access a single device, mobile or otherwise, they are presented with a single personality. Still another notable problem is the fact that each device owned by a single individual has its own artificial intelligence—in other words, certain elements such as personal information are duplicated and are not transferable between devices. Many attempts at developing an artificially intelligent personal agent are known in the prior art. Some of the most well known include SIRI and Cortana. These suffer from several problems. One such problem is that they do not share a common information base between devices. In addition, certain aspects of an artificial general intelligence ("AGI") used for human interaction such as voice should be consistent between devices. In other words a given personal assistant should have the same voice from device to device and should have access to and data generated on a particular device when the user access the agent from a different device. This might best be termed a "roaming personality." Still other problems center on authentication methods for personal data access.

Aspects of the present invention are directed to solving all of these problems by providing systems and methods for creating and implementing an artificially intelligent computer personality, as discussed in detail below.

Applicant(s) hereby incorporate herein by reference any and all patents and published patent applications cited or referred to in this application.

SUMMARY

Aspects of the present invention teach certain benefits in construction and use which give rise to the exemplary advantages described below.

The present invention solves the problems described above by providing a system and associated methods for creating and implementing an artificially intelligent agent or system residing in memory on an at least one computing device. In at least one embodiment, a target personality is implemented in memory on the at least one computing device and configured for interacting with an at least one communicating entity through responding to an at least one conversational input received therefrom. An at least one artificially intelligent conversational personality is also implemented in memory on the at least one computing device, each conversational personality configured for conversing with the target personality as needed in order to provide the target personality with appropriate knowledge and associated responses. For each conversational input received by the target personality, the conversational input is first processed to derive an at least one core meaning associated therewith. An appropriate raw response is determined for the at least one core meaning. The raw response is then formatted before being transmitted to the communicating entity. Thus, the target personality is capable of carrying on a conversation, even if one or more responses provided by the target personality are obtained in real-time from the at least one conversational personality, all while dynamically increasing the artificial intelligence of the target personality.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
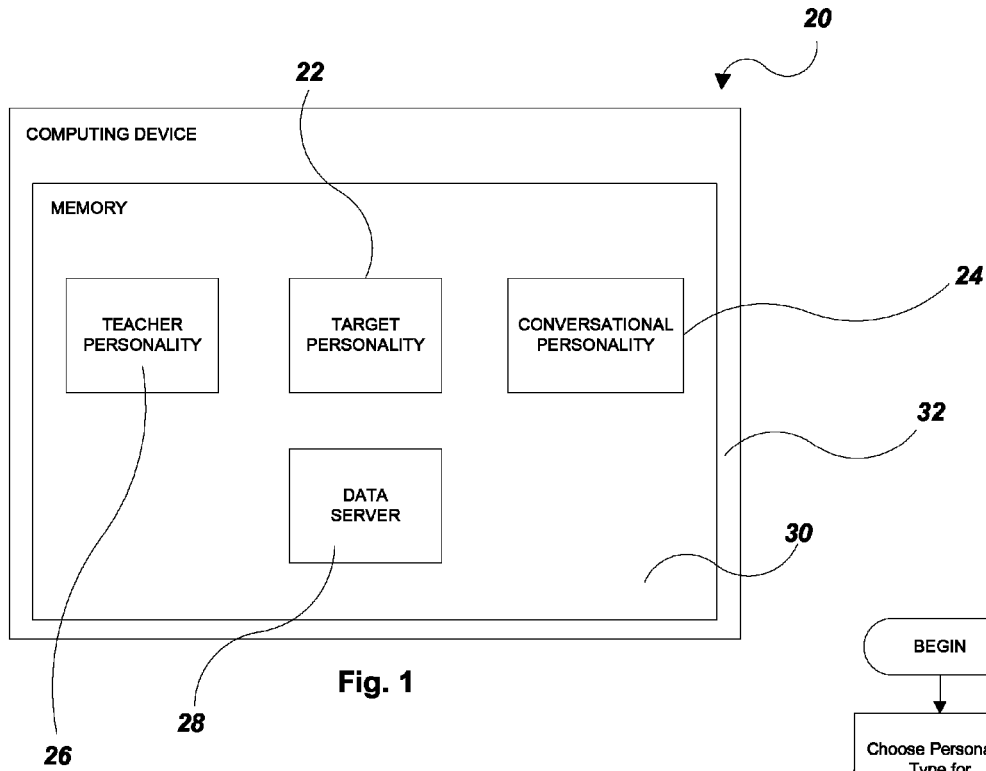
FIG. 1 is an architecture diagram of an exemplary system for creating an artificially intelligent computer personality, in accordance with at least one embodiment.

Turning now to FIG. 1, there is shown an architecture diagram of an exemplary system 20 for creating an artificially intelligent agent or system, in accordance with at least one embodiment. The system 20 comprises, in the exemplary embodiment, a target personality 22, an at least one conversational personality 24, a teacher personality 26, and a data server 28, each residing in memory 30 on an at least one computing device 32. It should be noted that the term "memory" is intended to include any type of electronic storage medium (or combination of storage mediums) now known or later developed, such as local hard drives, RAM, flash memory, external storage devices, network or cloud storage devices, etc. Furthermore, the various components of the system 20 may reside in memory 30 on a single computing device 32, or may separately reside on two or more computing devices 32 in communication with one another. The term "computing device" is intended to include any type of computing device now known or later developed, such as desktop computers, smartphones, laptop computers, tablet computers, etc. Additionally, the means for allowing communication between the various components of the system 20, when not residing on a single computing device 32, may be any wired- or wireless-based communication protocol (or combination of protocols) now known or later developed. It should also be noted that while the term "personality" is used throughout, each of the terms "agent" and "system" may be used interchangeably with the term "personality,"—and vice versa—depending in part on the context in which the system and associated methods are utilized.

With continued reference to FIG. 1, each conversational personality 24 is a computer personality that has been created previously, either by the present system 20 or through other means, now known or later developed. As discussed further below, the at least one conversational personality 24 is configured for conversing with the target personality 22 as needed in order to provide the target personality 22 with appropriate knowledge and associated responses. Depending on the context in which the system 20 is to be used, a given conversational personality 24 may possess a general knowledge base and associated responses (for general conversations), or it may possess a targeted or specific knowledge base and associated responses. For instance, if the target personality 22 is to be used in the context of functioning as a physician's assistant, the at least one conversational personality 24 would preferably possess a medical knowledge base and associated responses. In another example, if the target personality 22 is to be used in the context of functioning as a hospital administrator, at least one conversational personality 24 would preferably possess a medical knowledge base and associated responses, while another conversational personality 24 would preferably possess a business and/or administrative knowledge base and associated responses. In at least one such embodiment and where appropriate, the target personality 22 and/or at least one conversational personality 24 is provided access to one or more supplemental data sources (not shown)—such as medical dictionaries, Internet search engines, encyclopedias, etc.—for selectively increasing the knowledge base of the target personality 22 and/or conversational personality 24. Preferably, the accuracy of information obtained from any such supplemental data sources would be independently verified by the system 20 before being utilized.

The teacher personality 26 is yet another computer personality that has been created previously, either by the present system 20 or through other means, now known or later developed. As discussed further below, the teacher personality 26 is pre-programmed with a set of conversational inputs 34 consisting of various statements and/or interrogatories geared toward the particular type of target personality 22 to be created. Thus, the teacher personality 26 is configured for conversing with the target personality 22 (i.e., transmitting the conversational inputs 34 to the target personality 22) so that the target personality 22 may learn how to appropriately respond to the conversational inputs 34 through interacting with and receiving appropriate responses from the at least one conversational personality 24.

Figure 2:
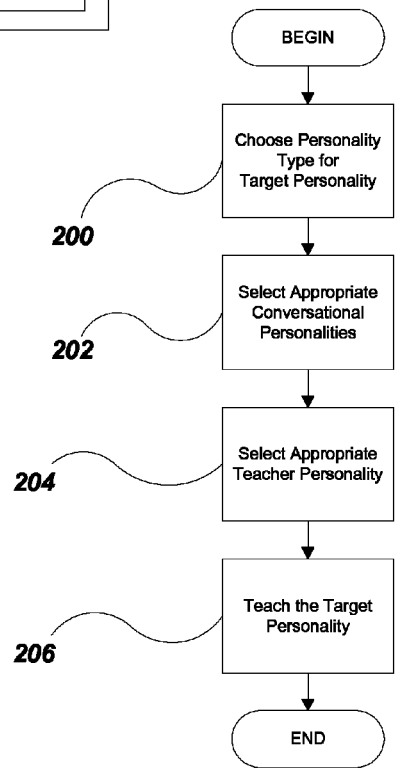
FIG. 2 is a flow diagram of an exemplary method for creating an artificially intelligent computer personality, in accordance with at least one embodiment.
Figure 3:
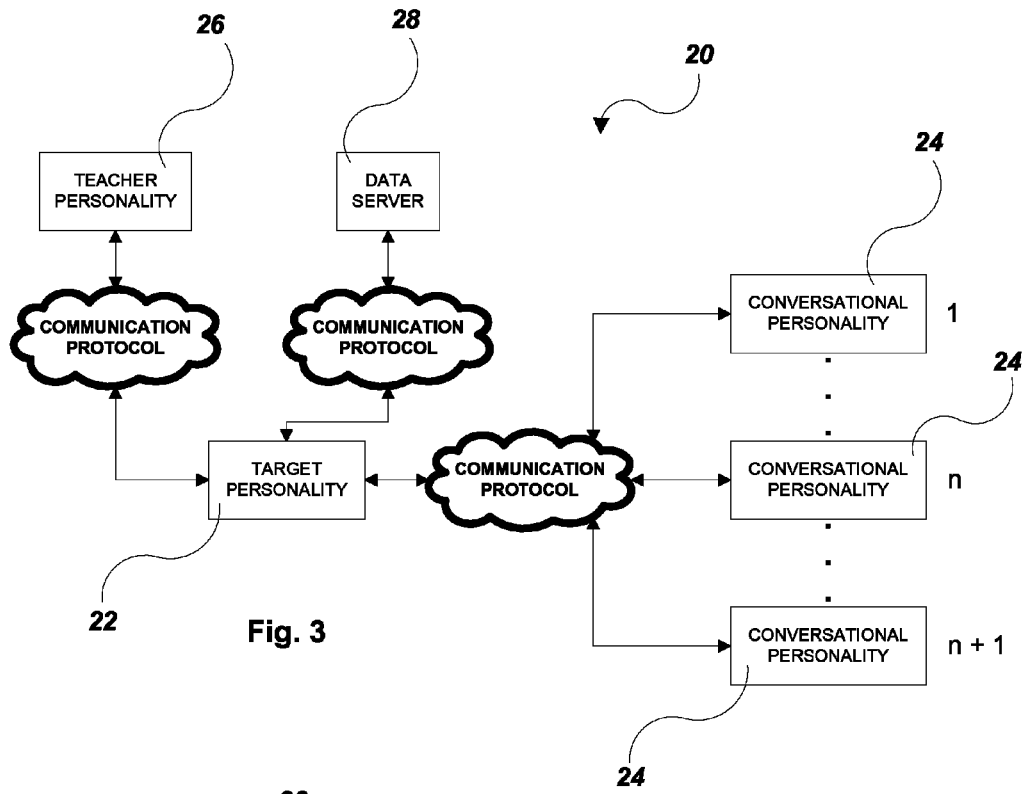
FIGS. 3 and 4 are schematic views of exemplary systems for creating an artificially intelligent computer personality, in accordance with at least one embodiment.
Figure 4:
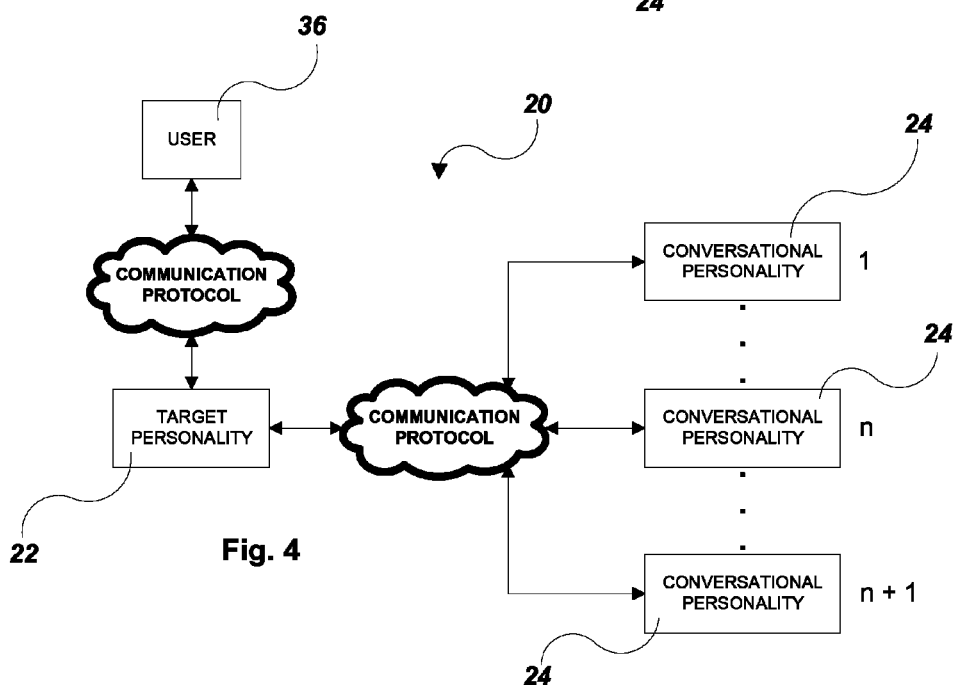

Thus, as illustrated in the flow diagram of FIG. 2, the exemplary method for creating an artificially intelligent computer personality comprises the steps of: choosing a desired personality type for the new target personality 22 to be created (200); based on that desired personality type, selecting one or more appropriate conversational personalities 24 (202); selecting an appropriate teacher personality 26 (204); and teaching the target personality 22 by allowing it to converse with the teacher personality 26 and selectively obtain appropriate responses from the at least one conversational personality 24 (206). A schematic view of this interoperability between each of the teacher personality 26, target personality 22 and conversational personalities 24, in accordance with at least one embodiment, is shown in FIG. 3. As illustrated in the schematic view of FIG. 4, once adequately taught, or even during the teaching process, a user 36 may be substituted for the teacher personality 26 for general interactions with the target personality 22. Thus, generally speaking, in at least one embodiment, the system 20 allows an at least one communicating entity—i.e., user 36, teacher personality 26, etc.—to selectively interact with the target personality 22 by receiving conversational inputs 34 from such communicating entity.

Figure 5:
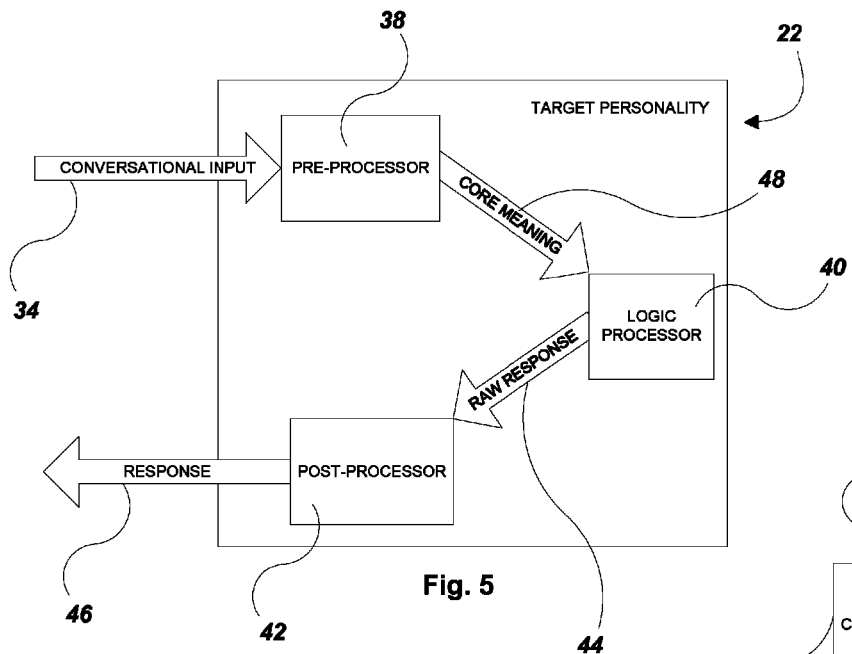
FIG. 5 is an architecture diagram of an exemplary target personality, in accordance with at least one embodiment.

Referring now to the architecture diagram of FIG. 5, in the exemplary embodiment, the target personality 22 utilizes an optimized clustering neural net by comprising a pre-processor 38, a logic processor 40, and a post-processor 42. As discussed further below, the pre-processor 38 is configured for processing conversational inputs 34 received from the user 36 (or the teacher personality 26), the logic processor 40 is configured for determining an appropriate raw response 44 to each conversational input 34 (i.e., a response having not yet been formatted for transmission to the user 36 or teacher personality 26) and performing any handoff tasks triggered by a particular input, and the post-processor 42 is configured for properly formatting and transmitting a response 46 to the user 36 (or the teacher personality 26) for each conversational input 34. It should be noted that, in at least one embodiment, each conversational personality 24 comprises these same components. Furthermore, in at least one embodiment and as discussed further below, each of the pre-processor 38, logic processor 40 and post-processor 42 is comprised of one or more specific purpose neuron ("SPN"), or modules, each SPN designed to perform a specific pre-determined task.

Figure 6:
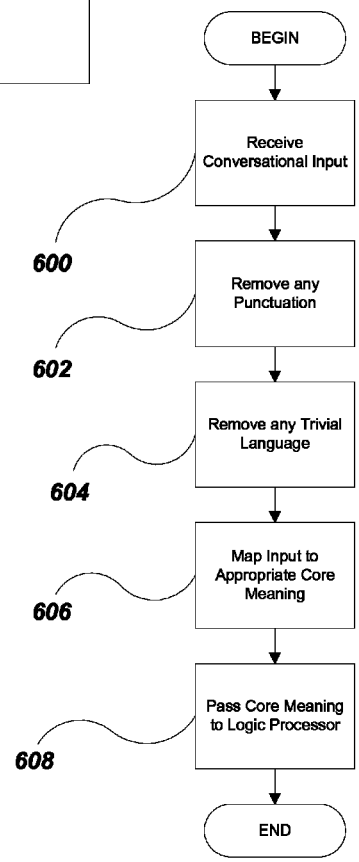
FIG. 6 is a flow diagram of an exemplary method for extracting a core meaning from a conversational input, in accordance with at least one embodiment.

As mentioned above, the pre-processor 38 is configured for processing conversational inputs 34 received from the user 36 (or the teacher personality 26). In other words, the pre-processor 38 pares each conversational input 34 down to a core meaning 48, in order to pass that core meaning 48 along to the logic processor 40 for determining an appropriate response. Thus, the pre-processor 38 does not parse text for language elements in this particular embodiment; but rather, it breaks down conversational inputs 34 in order to determine their respective core meanings 48. For example, the conversational inputs 34, "How are you," "How are you feeling," "How are you feeling, Vincent," and "How are you doing," are all interrogatories that map to a single core meaning 48 of, "how are you." In a bit more detail, and as illustrated in the flow diagram of FIG. 6, in the exemplary embodiment, upon receipt of a conversational input 34 (600), the pre-processor 38 first removes any and all punctuation from the conversational input 34 (602). This allows the target personality 22 to respond in exactly the same fashion as when converting speech to text, and also allows the target personality 22 to be able to detect and respond to inflection. Next, the pre-processor 38 removes any trivial language (i.e., language in the conversational input 34 that is determined to have no real bearing on the core meaning 48) (604). For example, the conversational input 34, "Hey, Vince, how are you feeling" contains the language, "Hey, Vince" which could be considered trivial as having no real bearing on the core meaning 48 of, "how are you." In at least one embodiment, the pre-processor 38 is also configured for recognizing variations of a particular core meaning 48 in the conversational input 34 and mapping those variations to (i.e., substituting those variations with) the appropriate core meaning 48 (606). For example, the conversational input 34, "What's your name" would be mapped to (i.e., substituted with) the core meaning 48, "what is your name." In another example, the conversational input 34, "Howya doin" would be mapped to the core meaning 48, "how are you." In addition to mapping strings of characters, in at least one embodiment, the pre-processor 38 is configured for mapping numbers as well—i.e., mapping character-based numbers (ex., "two") to their numerical representations (ex., "2") or vice versa.

In at least one such embodiment, the pre-processor 38 maintains a relational list of functions in an XML document, with each function containing a unique conversational input 34 along with the core meaning 48 to which that conversational input 34 should be mapped. Thus, for a given conversational input 34 in such an embodiment, the pre-processor 38 simply iterates through the list of functions until the matching conversational input 34 is found, at which point the associated function returns the corresponding core meaning 48. As such, this form of fuzzy string substitution allows the pre-processor 38 to map a wide range of conversational inputs 34 to their appropriate core meanings 48. In a further such embodiment, the fuzzy string substitution algorithm is capable of accepting and returning variables, which allows the pre-processor 38 to pass to the logic processor 40 dynamically created core meanings 48 rather than only static core meanings 48. For example, if the conversational input 34 is, "If a car is traveling 60 miles an hour, how far will it travel in 2 hours," the pre-processor 38 would first iterate through the list of functions until the matching static portion of the conversational input 34 is found, at which point the associated function would return the appropriate core meaning 48 containing the variable portion of the conversational input 34. Thus, in the above example, the core meaning 48 would be, "solve x=60*2." In further embodiments, other methods for accomplishing this particular functionality, now known or later developed, such as a lookup table or database, may be substituted.

In a still further embodiment, the pre-processor 38 contains a self-organization module configured for catching core meanings 48 that might be initially missed due to the wording of a particular conversational input 34. For example, where the conversational input 34 is, "What time is it buddy," the pre-processor 38 may initially miss the core meaning 48 of "what time is it" due to the inclusion of the word "buddy" at the end of the sentence. In such a scenario, the pre-processor 38 would cause the target personality 22 to initially respond by asking the user 36 (or teacher personality 26) to re-phrase their conversational input 34. For example, the target personality 22 may respond with, "Sorry, I didn't understand that," or, "Can you please re-phrase that." Upon receipt of a re-phrased conversational input 34, and assuming the pre-processor 38 is able to derive the appropriate core meaning 48 from that conversational input 34, the pre-processor 38 is then able to create a new function that maps the new conversational input 34 that was initially missed to the appropriate core meaning 48, so as not to miss it again in the future. In the exemplary embodiment, the pre-processor 38 accomplishes this by taking the conversational input 34 for the function that worked and performing a differential match against the conversational input 34 that initially failed. The pre-processor 38 then takes the portion of the conversational input 34 that did not match and, from a pool of regular expression elements, adds that portion to the pattern that matched the subsequent conversational input 34. In further embodiments, other methods for accomplishing this particular functionality, now known or later developed, may be substituted.

Again, once the core meaning 48 has been derived, the pre-processor 38 passes the core meaning 48 to the logic processor 40 (608).

As mentioned above, the logic processor 40 is configured for determining an appropriate response to the core meaning 48 of each conversational input 34. In the exemplary embodiment, as illustrated in the flow diagram of FIG. 7, after the pre-processor 38 has received a conversational input 34 (700) and extracted the at least one core meaning 48 therefrom (702), the logic processor 40 determines whether a first of the at least one core meaning 48 contains any objects (704), as discussed further below—if so, the objects are processed (1200), as also discussed further below. The logic processor then determines whether the first of the at least one core meaning 48 is new, or whether it has encountered that particular core meaning 48 before (706).

In a bit more detail, the logic processor 40 is configured for treating everything as an object. This applies to speech as well. For example, the term "Hello" would be considered an object as would the term "Vincent." The logic processor 40 is able to combine objects and, as such, can respond to core meanings 48 that it has never before encountered or has been programmed to handle, as discussed further below. Thus, in the above example, the phrase, "Hello Vincent" would be considered a further object.

In the exemplary embodiment, the logic processor 40 consists of various modules that are loaded and arranged dynamically depending on the particular core meaning 48 that it is to process and/or other environmental variables that might be relevant to the particular core meaning 48 that it is to process (i.e., time of day, geographic location of the user 36, etc.). Thus, each module is preferably created as a dynamic link library and represents certain base functions. In the exemplary embodiment, a module list is stored as an XML document and contains the location of each module's dynamic link library along with a description of each module's functions. The order of the modules represents the order in which they are to be called by the logic processor 40. The list is also preferably self-configurable, meaning that certain conditions present in a given core meaning 48 can cause or allow the logic processor 40 to order, re-order, or modify the list of functions. For example, an emergency condition present in the core meaning 48 can cause the logic processor 40 to remove the emotional response module from the list, thereby causing the logic processor 40 to function purely analytically. In another example, an intrusion detection present in the core meaning 48 can cause the logic processor 40 to remove the application and system function modules from the list, thereby preventing an unauthorized user 36 from accessing application and system functions. In at least one embodiment, the pre-processor 38 is configured for dynamically configuring the module list, based on the content of a given core meaning 48, so that only modules which are needed to process and respond to that core meaning 48 are loaded into the logic processor 40, thereby reducing overall processing time.

In at least one embodiment, the logic processor 40 provides an at least one anomalous speech pattern detection module. In one such embodiment, the anomalous speech pattern detection module enables the logic processor 40 to detect whether or not the core meaning 48 contains a greeting such as, "Hello." From this, the logic processor 40 is able to automatically extrapolate that the core meaning 48, "Hello there" is also a greeting and would thus add that core meaning 48 to the list of recognized greetings. In another such embodiment, the anomalous speech pattern detection module enables the logic processor 40 to detect whether a core meaning 48 has been repeated by the user 36 (i.e., whether the user 36 has asked the same question or input the same statement more than once, even if phrased differently each time).

In the exemplary embodiment, the logic processor 40 also provides a response module configured for determining the appropriate raw response 44 to a given core meaning 48. In a bit more detail and with continued reference to FIG. 7, the response module of the logic processor 40, again, determines whether the core meaning 48 has been encountered before (706). In at least one such embodiment, as shown in the exemplary illustration of FIG. 8, each core meaning 48 is stored in a separate response file 50 along with the corresponding raw response 44. The response files 50 are stored in the system 20, either within the data server 28 or in another database stored elsewhere in memory 30. It should be noted that, for purely illustrative purposes, the exemplary response file 50 is shown as an XML file; however, the scope of potential implementations of the system 20 should not be read as being so limited. With continued reference to FIG. 8, in at least one embodiment, each response file 50 contains further details related to the associated core meaning 48 and raw response 44, including but not limited to a mood value 52, a weight value 54, a creation date 56, a creator name 58, an edit date 60, and an editor name 62.

The mood value 52 indicates the type of emotion that is to accompany the raw response 44 to the core meaning 48 of a given response file 50. For example, in the exemplary embodiment, a value of "0" is intended to indicate "normal," a value of "1" is intended to indicate "happy," a value of "2" is intended to indicate "angry," a value of "3" is intended to indicate "distracted," and a value of "4" is intended to indicate "sad." Certainly, in further such embodiments, the specific types of emotions (or moods) and associated mood values 52 may vary. Relatedly, the weight value 54 indicates the amount or strength of appropriate mood that is to accompany the raw response 44 associated with the core meaning 48 of a given response file 50. For example, in the exemplary embodiment, a value of "0" is intended to indicate a mild form of the associated mood, while a value of "10" is intended to indicate a very strong form of the associated mood. The use of the mood value 52 and weight value 54 is discussed further below.

The creator name 58 indicates the entity which originally added the given response file 50 to the system 20. This can include manual additions by a user 36, automated additions by a conversational personality 24, or automated additions by the target personality 22. Relatedly, the creation date 56 indicates the date on which the given response file 50 was added to the system 20. Similar to the creator name 58, the editor name 62 indicates the entity which most recently edited the given response file 50, while the associated edit date 60 indicates the date on which such recent changes were made.

In at least one embodiment, a separate database containing information related to users 36 is maintained, and a rank is assigned to each user 36. As such, if multiple raw responses 44 (i.e., multiple response files 50) are found containing the same core meaning 48, the raw response 44 having the highest rank (i.e., the raw response 44 having been created or edited by the user 36 having the highest ranking) is selected. This allows the target personality 22 to always override any response file 50 which is created or edited by an entity with a relatively lower rank. Additionally, the system 20 preferably tracks the number of times a particular entity has had its original response file 50 edited by a user 36 with a higher ranking. In this way, reliability of input can be established. In essence then, better sources' response file 50 content begin to be recognized as more reliable than other sources, and are able to be favored. This also allows the target personality 22 to "mature" by creating a "takeover point," such as, for example, by constructing an algorithm which resets the assigned value of the "parent" below the assigned value of the target personality 22 when the number of synthesized or learned responses that do not have to be corrected exceeds the number of synthesized responses that are corrected.

Referring again to FIG. 7, in the exemplary embodiment, the response module of the logic processor 40 determines whether the core meaning 48 has been encountered before (706) by iterating through each of the response files 50 (which are preferably sorted in a logical manner, such as alphabetically by core meaning 48) to try and find that particular core meaning 48. If the core meaning 48 is found in one or more of the response files 50, the best associated raw response 44 is accessed (708) and passed along to the post-processor 42 for formatting (710) and transmission to the user 36 (or teacher personality 26) (712), as discussed further below. If the core meaning 48 is not found in any of the response files 50, then it has not been encountered before and so the logic processor 40 then transmits the core meaning 48 to one or more of the conversational personalities 24 in order to obtain an appropriate raw response 44 therefrom (714). Upon receipt of one or more potential raw responses 44 from the conversational personalities 24 (716), the logic processor 40 determines which potential raw response 44 is best (718) using one or more of the methods described above. Additionally, or in the alternative, the logic processor 40 may determine the best potential raw response 44 by loading each potential raw response 44 into a dataset, then iterating through them so as to try and match portions of each potential raw response 44 to raw responses 44 that have already been stored in other response files 50. A new response file 50 is created for the best raw response 44, along with the associated core meaning 48, and the response file 50 is added to the system 20 (720). The logic processor 40 then determines whether the raw response 44 contains any objects (722), as discussed further below—if so, the objects are processed (1200), as also discussed further below. The raw response 44 is then passed along to the post-processor for formatting (710) and transmission to the user 36 (or teacher personality 26) (712), as discussed further below.

Figure 7:
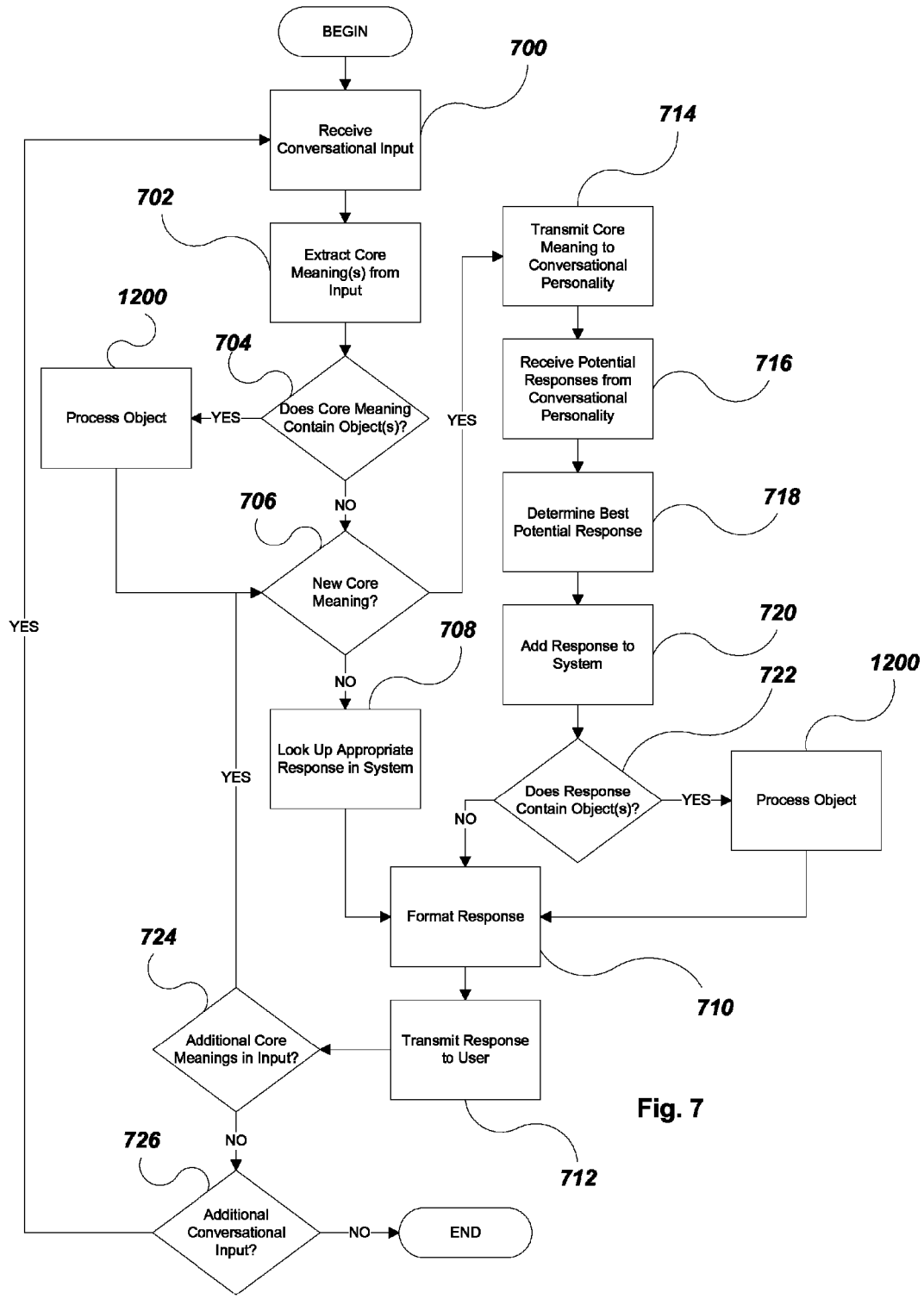
FIG. 7 is a flow diagram of an exemplary method for processing and responding to an at least one conversational input, in accordance with at least one embodiment.
Figure 8:
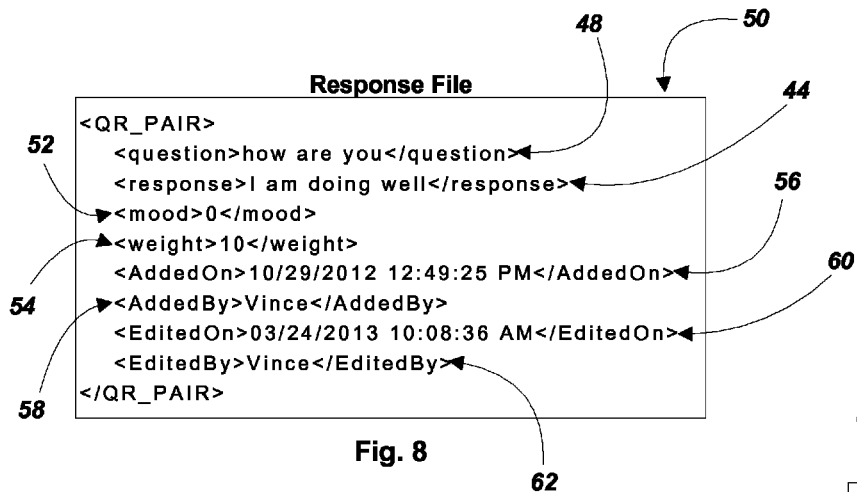
FIG. 8 is an illustration of an exemplary response file, in accordance with at least one embodiment.

With continued reference to FIG. 7, if additional core meanings 48 are present in the conversational input 34 (724)—for example, if the conversational input 34 is, "Hello, what is your name and where are you located?"—the logic processor 40 performs the above described steps for each core meaning 48 (i.e., "hello," "what is your name," and "where are you located"), so as to obtain a raw response 44 to each core meaning 48. Furthermore, these steps are repeated for each conversational input 34 transmitted by the user 36 (or teacher personality 26) until the conversation with the target personality 22 is ended (726). In this way, even with a minimum number of pre-loaded response files 50 in the system 20, a conversation can be carried on by the target personality 22 which will appear to have come directly from the target personality 22, even if unknown raw responses 44 have been loaded in real-time from one or more conversational personalities 24; all the while, dynamically increasing the number of response files 50 (and, thus, the artificial intelligence) of the target personality 22.

As mentioned above, in the exemplary embodiment, the logic processor 40 is configured for treating everything as an object. This becomes most useful where a given conversational input 34 or response 46 is not entirely static, but rather contains one or more variables. In a bit more detail, the logic processor 40 is configured for representing any object and/or any variation of such objects using two object properties: taxonomy 64 and attributes 66. Furthermore, in at least one embodiment, the logic processor 40 divides objects into two categories: entities and events. In at least one further embodiment, the logic processor 40 is configured for representing any object and/or any variation of such objects using three object properties: taxonomy 64, attributes 66 and events. Either way, this construction is universal and applies to any object now known or later developed or discovered, such that that it is never necessary to re-program the logic processor 40 with additional data types. Additionally, this method allows the logic processor 40 to learn by natural language processing, as there is no need to pre-classify data as it is encountered, given that a member of any taxonomy 64 of a particular object can also be classified as an attribute 66 of another object. As shown in the exemplary illustration of FIG. 10, each object is preferably stored in a separate object file 68 in the system 20, either within the data server 28 or in another database stored elsewhere in memory 30. It should be noted that, for purely illustrative purposes, the exemplary object file 68 is shown as an XML file; however, the scope of potential implementations of the system 20 should not be read as being so limited.

Figure 10:
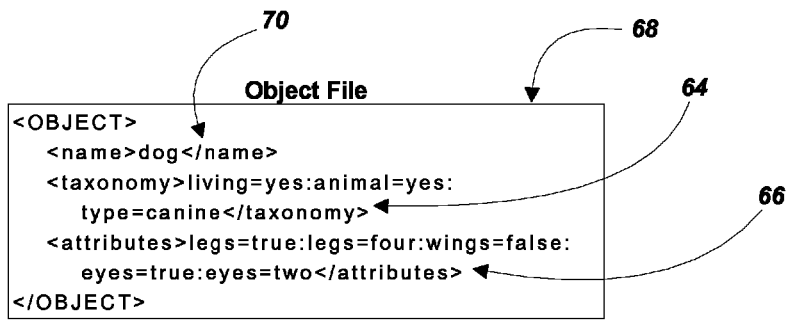
FIGS. 10 and 11 are illustrations of exemplary object files, in accordance with at least one embodiment.
Figure 11:
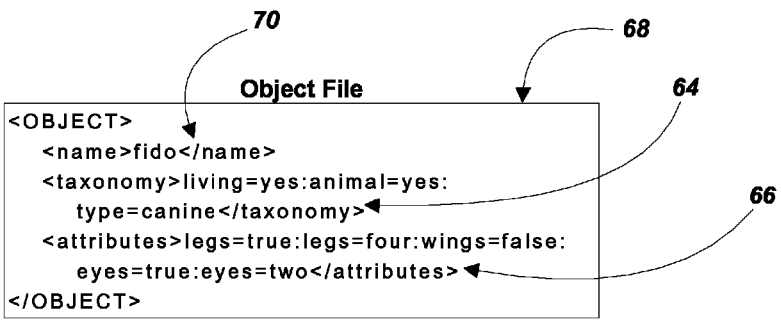
Figure 12:
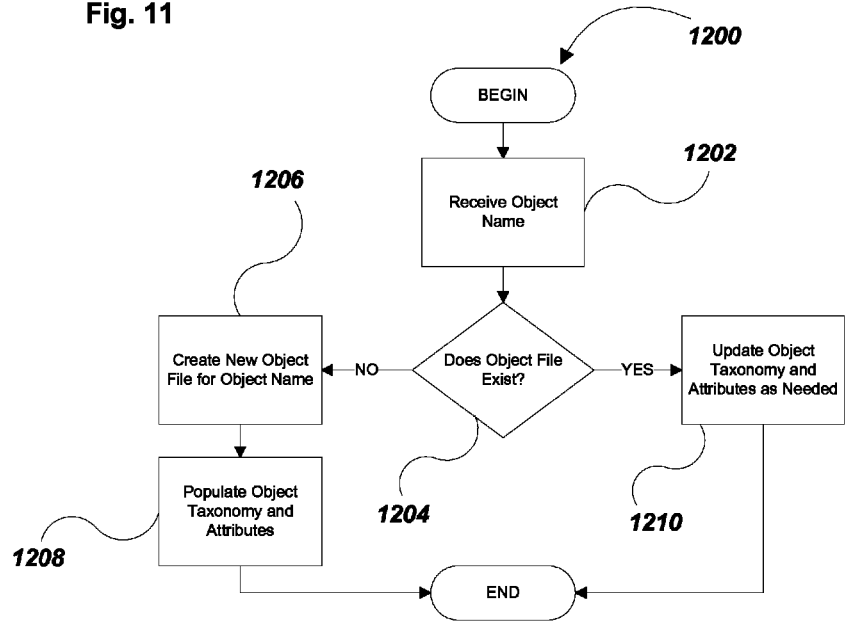
FIG. 12 is a flow diagram of an exemplary method for processing an object, in accordance with at least one embodiment.

With continued reference to FIG. 10, in addition to a taxonomy 64 and attributes 66, each object file 68 has a unique object name 70. For example, the instance of the exemplary object file 68 shown in FIG. 10 has an object name 70 of "dog." Additionally, the taxonomy 64 of the object file 68 contains details that inform the logic processor 40 of the fact that the "dog" object is a living animal of the canine type, while the attributes 66 of the object file contain details that inform the logic processor 40 of the fact that the "dog" object has four legs, no wings, and two eyes. As the logic processor 40 receives further details related to the "dog" object, it dynamically adds those further details to the taxonomy 64 and attributes 66 of the associated object file 68. For example, should the logic processor 40 receive the core meaning 48, "a dog has teeth," the logic processor 40 would access the associated object file 68 and add, "teeth=true" to the attributes 66. As shown in the flow diagram of FIG. 12, in the event the logic processor 40 receives details related to a new object—i.e., receives an object name 70 (1202) that does not exist in any of the object files 68 residing in the system 20 (1204)—either through a core meaning 48 or a raw response 44 received from one or more of the conversational personalities 24, the logic processor 40 creates a new object file 68 for the new object name 70 (1206) and populates the taxonomy 64 and/or attributes 66 with any relevant information contained in the core meaning 48 or raw response 44 (1208); otherwise, again, if the object already exists, logic processor 40 simply dynamically adds any new details to the taxonomy 64 and attributes 66 of the associated object file 68 (1210). Additionally, where it is determined that the new object name 70 is a subset of a pre-existing object, the logic processor 40 populates the taxonomy 64 and/or attributes 66 of the new object file 68 with all relevant taxonomy 64 and attributes 66 of the related pre-existing object file 68. For example, as shown in the exemplary illustration of FIG. 11, upon the logic processor 40 receiving the core meaning 48, "I have a dog named Fido," and determining that no object file 68 currently contains the object name 70, "fido," the logic processor 40 creates a new object file 68 containing that object name 70. Additionally, because the core meaning 48 states that Fido is a dog, the logic processor 40 automatically populates the taxonomy 64 and attributes 66 of the new "fido" object file 68 with the taxonomy 64 and attributes 66 of the "dog" object file 68. Thus, the number of cycles required to process a core meaning 48 such as, "Is Fido alive?" is greatly reduced as there is no need to search for the object name 70 "fido," discover that "fido" is a dog, then look up the object name 70 "dog" to determine whether it is a living being—instead, the logic processor 40 simply looks up the object name 70 "fido."

In addition to treating all entities and events mentioned in core meanings 48 and/or raw responses 44 as objects, the logic processor 40 also treats users 36 as objects, in at least one embodiment. In a bit more detail, upon the user 36 (or the teacher personality 26) beginning a conversation with the target personality 22, the logic processor 40 (via the post-processor 42) prompts the user 36 for their name and subsequently checks for an object file 68 containing that object name 70 (and creates a new object file 68 if it is determined that one does not already exist—i.e., if the user 36 is new). For new users 36, the logic processor 40 may also be configured for prompting the user 36 for additional information—such as address, age, gender, likes or dislikes, etc.—in order to populate the taxonomy 64 and/or attributes 66 of the associated object file 68. Alternatively, where the logic processor 40 determines that an object file 68 already exists for the user 36, the logic processor 40 may be configured (in at least one embodiment) to prompt the user 36 to provide correct answers to questions related to the taxonomy 64 and/or attributes 66 contained in the user's 36 object file 70, in order to verify the identity of the user 36. In further such embodiments, the logic processor 40 may be configured for prompting the user 36 to provide details about past conversations with the target personality 22 in order to verify the identity of the user 36.

Figure 13:
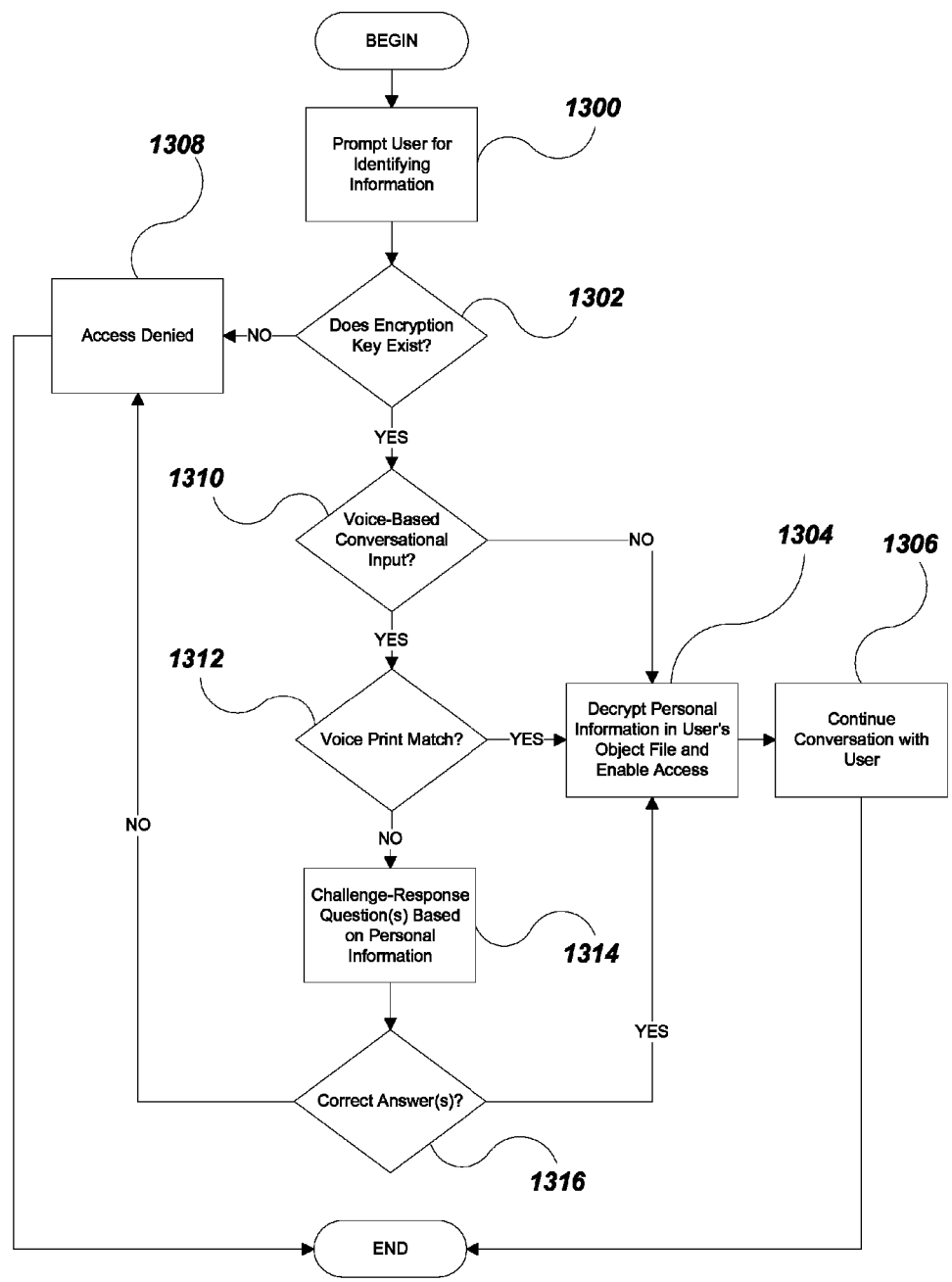
FIG. 13 is a flow diagram of an exemplary method for dynamically and securely personalizing an exemplary computer personality, in accordance with at least one embodiment.

In at least one such embodiment, as illustrated in the flow diagram of FIG. 13, this means for verifying the identity of the user 36 is utilized for dynamically personalizing the communications between the target personality 22 and the user 36 by accessing the information securely stored in the object file 68 associated with the user 36; thus, creating somewhat of a "roaming" artificial intelligence. In a bit more detail, as the logic processor 40 receives new information related to the user 36 (as discussed above), that information is encrypted using a unique encryption\decryption key. This is critical to preventing "man in the middle" or "replay" attacks against the system 20 where voice or text data is intercepted and used to access the system 20. Upon the same user 36 subsequently initiating a new conversation with the target personality 22, the logic processor 40 verifies the identity of the user 36 by prompting the user 36 for their name or some other piece of identifying information (1300), then checks for the existence of an encryption\decryption key associated with that particular user 36 in the system 20 (1302). If found, the key is then used to decrypt the personal information that has been encrypted (1304) in order to utilize that information as appropriate while communicating with the user 36 (1306). If no key is found, the logic processor 40 denies access to the user 36 (1308) and the personal information is not decrypted. Alternatively, if the user 36 is communicating with the target personality 22 via voice-based conversational inputs 34 (1310), rather than text-based conversational inputs 34, the logic processor 40 performs a voice print analysis as a further verification step (1312). In still further embodiments, additional checks are performed to verify the identity of the user 36, including but not limited to facial recognition analysis and checking the last known GPS-based location of the user 36 (or computing device in the possession of the user 36) against the current location. If any of these checks fail, the logic processor 40 initiates a question\answer challenge-response sequence. This involves asking the user 36 randomly generated questions which contain information that only the user 36 would know (1314), as discussed above, then determining whether the user's 36 responses are correct (1316). This process may go on until the identity of the user 36 is either confirmed or rejected. Once this multi-part authentication process has been successfully negotiated, data such as personal and other sensitive information associated with the user 36 is made available to the user 36 in a global fashion (1304).

In at least one embodiment, the system 20 maintains an offset value representing the probability that various credentials are fraudulent. This offset is produced by gathering various intelligences related to user behavior and world view statistics which are then fed into a Bayesian probability function. These parameters would include but not be limited to the type and manufacturer of software packages installed on the user's computing devices, the number of times that flaws have been exposed in these software packages, verified news items indicating current ongoing risks, the amount of time the user spends on the Internet, etc. This offset is called recursively as the L and the M variables (which are then the M and the L in the next round) in the probability function resulting in a final probability that all of the various "pass/fail" elements were compromised. Another embodiment would simply force a logoff at a fail. Native probability elements are elements which are probability based having no capability other than threshold passing wherein they might be used in "pass/fail" functions. These might include but would not be limited to location tracking, facial recognition, voice recognition, etc. In at least one such embodiment, these scores would be summed, and the result would be inversely relational to the offset generated and maintained by the system 20.

Use of the GPS-based location of the user 36 (or computing device in the possession of the user 36) can be beneficial in other contexts besides authentication, including instances of the system 20 designed to function as a personal assistant (i.e., roaming artificial intelligence). For example, a user 36 who is driving may create a grocery list by communicating with the target personality 22 of the system 20 via a computing device installed in the automobile. This data is then stored in the system 20 either by a periodic update process or by a direct command. When the user 36 exits their vehicle and enters the store, the same target personality 22 with access to the grocery list is automatically made available on their smart phone or other mobile computing device. Similarly the data from purchases made by the user 36 can be scanned or otherwise entered into the smart phone or other mobile computing device and made available to a computing device (in communication with the system 20) installed in the home of the user 36.

When used as an intelligent agent, in at least one embodiment, the system 20 utilizes a "split horizon" architecture arranged in a client server model. Since the target personality 22 exists on the client as well as the server in such an embodiment, modules specific to functions that are performed client side can be created and installed. Certain basic logic and communication functions can also exist on the client side so that if contact with the server is broken, the client will still function albeit with a lessened degree of functionality. Since the optimized clustering neural network employed by the system 20 (in at least one embodiment) allows for multiple linear chains to be run in parallel, a second chain can be run which updates information such as GPS data from a mobile device and pushes it to the server. Voice and other data can be generated on the server side, and returned to the client. This allows for consistent voice synthesis when the target personality 22 roams from device to device. This allows for true AGI with consistent voice content unlike technologies in the prior art which rely on recorded speech. In another embodiment, the host server of the system 20 might be interfaced with a commercial voice server technology.

Figure 9:
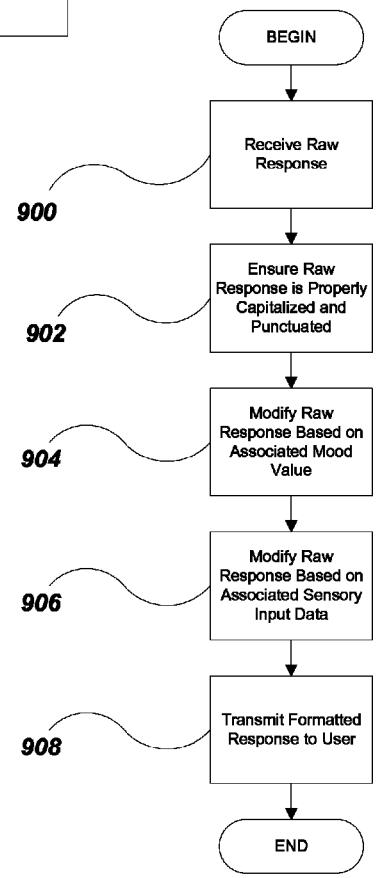
FIG. 9 is a flow diagram of an exemplary method for formatting and transmitting a response to a core meaning, in accordance with at least one embodiment.

As mentioned above, the post-processor 42 is configured for properly formatting and transmitting the response 46 to the user 36 (or the teacher personality 26) for each conversational input 34. As illustrated in the flow diagram of FIG. 9, in the exemplary embodiment, upon receipt of the raw response 44 (900), the post-processor 42 converts the raw response 44 into the properly formatted response 46 by first adding proper capitalization and punctuation (if not already included in the raw response 44 by virtue of the data contained in the associated response file 50) (902). In one such embodiment, data is maintained in the system 20 regarding common first names, surnames, country and state names, and other words which are traditionally capitalized. The post-processor 42 parses the raw response 44 into individual words, iterates through these words, and if a known name or other commonly capitalized word is encountered, the first letter is capitalized. In further embodiments, other methods for accomplishing this particular functionality, now known or later developed, may be substituted.

As also mentioned above, in at least one embodiment, each response file 50 contains a mood value 52 and a weight value 54 related to the associated core meaning 48 and raw response 44. Thus, where such details are provided, the post-processor 42 factors them in during the formatting process and modifies the raw response 44 accordingly (904). This is most commonly used where the conversational input 34 (and, thus, the core meaning 48) is seeking to obtain the target personality's 22 opinion of or emotional reaction to (i.e., whether the target personality 22 likes or dislikes) the subject matter of the core meaning 48. In the exemplary embodiment, this is accomplished by either aggregating or differentiating the respective weight values 54 of the at least one mood value 52 associated with the raw response 44 so as to arrive at a final emotional reaction to incorporate into the formatted response 46.

As mentioned above, in at least one embodiment, the target personality 22 is provided access to one or more supplemental data sources—such as medical dictionaries, Internet search engines, encyclopedias, etc.—for selectively increasing the knowledge base of the target personality 22. Such supplemental data sources may also be utilized by the logic processor 40 to confirm the accuracy or correctness of an assertive core meaning 48, or to seek the answer to an inquisitive core meaning 48. Because such searching may take time, in the exemplary embodiment, the logic processor 40 utilizes multithreaded processing so as to not delay the conversation between the target personality 22 and the user 36 (or teacher personality 26). In a bit more detail, upon the logic processor 40 receiving such a core meaning 48 that requires research, the logic processor first transmits a non-committal response to the post-processor 42 (such as, "let me get back to you on that") and allows the conversation to continue. Meanwhile, the logic processor 40 concurrently initiates a second thread for performing the necessary research. Upon concluding the research, the logic processor 40 interrupts the conversation and transmits the researched response to the post-processor 42 for communication to the user 36.

In certain embodiments, where the target personality 22 has access to one or more sensory input devices, such as cameras or microphones, the post-processor 42 may factor in those details during the formatting process and further modify the raw response 44 accordingly (906).

Once the raw response 44 is converted into the properly formatted response 46, the formatted response 46 is transmitted to the user 36 (or teacher personality 26) (908).

Referring again to FIG. 4, during actual use of the system 20 (i.e., during a conversation between the user 36 and the target personality 22), in at least one embodiment, the data server 28 is pre-loaded with information related to the user 36, allowing relevant personal details to be included as variables in certain raw responses 44. For example, upon receipt of the conversational input 34, "Who was Richard Nixon," the raw response 44 could be, "Richard Milhaus Nixon was the 37th President of the United States and served in office from 1969 to 1974—roughly 14 years before you were born." Populating the data server 28 with such information could be accomplished in any number of ways, including but not limited to having the user 36 complete a questionnaire prior to interacting with the target personality 22 for the first time, having the user 36 speak (or type) about themselves briefly at the beginning of the first conversation with the target personality 22, scanning personal history documents related to the user 36, etc.

In at least one embodiment, within the data server 28 is also stored a separate dataset that is maintained by the system 20 and contains a natural language representation of each topic that was presented by the user 36 (or teacher personality 26) via conversational inputs 34. In this way, the target personality 22 is able to recall previous conversational inputs 34. This dataset can be edited manually or the target personality 22 can synthesize responses by using regular expressions to compare existing natural language topical responses to existing raw responses 44 and replacing variables. When queried as to topic, the target personality 22 looks for the matching core meaning 48 in a response file 50, and returns the topical raw response 44.

It should be noted that, in at least one alternate embodiment, the pre-processor 38 may be omitted from the target personality 22; thus, rather than first extracting the core meaning 48 from a given conversational input 34, the logic processor 40 would simply create and store a separate response file 50 for each unique conversational input 34 encountered (i.e., rather than only creating and storing a separate response file 50 for each unique core meaning 48). Similarly, in at least one further alternate embodiment, the post-processor 42 may be omitted from the target personality 22; thus, rather than formatting each raw response 44 as provided by the associated response file 50, the response files 50 themselves would contain properly formatted responses 46.

Aspects of the present specification may also be described as follows:

1. A method for creating and implementing an artificially intelligent agent residing in memory on an at least one computing device and configured for taking appropriate action in response to an at least one conversational input, the method comprising the steps of: implementing a target personality of the agent in memory on the at least one computing device; implementing an at least one artificially intelligent conversational personality in memory on the at least one computing device, each conversational personality configured for conversing with the target personality as needed in order to provide the target personality with appropriate knowledge and associated responses; allowing an at least one communicating entity to interact with the target personality by receiving the at least one conversational input from the communicating entity; and for each conversational input received by the target personality: processing the conversational input to derive an at least one core meaning associated therewith; determining an appropriate raw response for the at least one core meaning; formatting the raw response; and transmitting the formatted response to the communicating entity; whereby, the target personality of the agent is capable of carrying on a conversation, even if one or more responses provided by the target personality are obtained in real-time from the at least one conversational personality, all while dynamically increasing the artificial intelligence of the target personality.

2. The method according to embodiment 1, further comprising the steps of: choosing a desired personality type for the target personality; and selecting one or more appropriate conversational personalities with which the target personality should communicate, based on the desired personality type for the target personality.

3. The method according to embodiments 1-2, wherein the step of allowing an at least one communicating entity to interact with the target personality further comprises the steps of: implementing an at least one teacher personality in memory on the at least one computing device, each teacher personality configured for transmitting to the target personality a set of pre-defined conversational inputs so that the target personality may learn how to appropriately respond to the conversational inputs through interacting with and receiving appropriate responses from the at least one conversational personality; and selecting an appropriate teacher personality with which the target personality should communicate, based on the desired personality type for the target personality.

4. The method according to embodiments 1-3, wherein the step of allowing an at least one communicating entity to interact with the target personality further comprises the step of allowing an at least one human user to selectively transmit to the target personality the at least one conversational input.

5. The method according to embodiments 1-4, wherein the step of processing the conversational input further comprises the steps of: maintaining a relational list of all conversational inputs encountered by the target personality along with the core meanings associated with each such conversational input; removing any punctuation from the conversational input; removing any language from the conversational input that is determined to have no bearing on the core meaning; and mapping the conversational input to the associated core meaning stored in the relational list.

6. The method according to embodiments 1-5, wherein the step of determining an appropriate raw response further comprises the steps of, for each core meaning associated with the conversational input: upon determining that the core meaning contains an at least one object, processing said at least one object; maintaining a set of response files containing all core meanings encountered by the target personality along with the raw responses associated with each such core meaning; determining whether the core meaning is new or whether the core meaning has been encountered before by the target personality; upon determining that the core meaning has been encountered before: mapping the core meaning to the at least one associated raw response stored in the response files; and determining which of the at least one associated raw response is the most appropriate; and upon determining that the core meaning is new: transmitting the core meaning to the at least one conversational personality; receiving an at least one raw response from the conversational personality; determining which of the at least one raw response is the most appropriate; adding the core meaning and associated raw response deemed most appropriate to the response files; and upon determining that the raw response contains an at least one object, processing said at least one object.

7. The method according to embodiments 1-6, further comprising the steps of: storing in the set of response files a mood value associated with each raw response, said mood value indicating the type of emotion that is to accompany the associated raw response; and modifying the raw response to reflect the type of emotion defined by the mood value.

8. The method according to embodiments 1-7, further comprising the steps of: storing in the set of response files a weight value associated with the mood value of each raw response, said weight value indicating the strength of appropriate mood that is to accompany the associated raw response; and modifying the raw response to reflect the strength of appropriate mood defined by the weight value.

9. The method according to embodiments 1-8, wherein the step of determining which of the at least one raw response is the most appropriate further comprises the steps of: assigning a rank to each communicating entity and conversational personality; in each response file, storing information related to the communicating entity or conversational personality responsible for creating or last editing the raw response contained in said response file, said information including the rank; and upon discovering multiple raw responses associated with a given core meaning, determining which of said raw responses has the highest rank associated therewith.

10. The method according to embodiments 1-9, wherein the step of processing the at least one object further comprises the steps of: maintaining a set of object files containing information associated with all objects encountered by the target personality, each object file containing at least one of an object name, an object taxonomy, and an object attribute; and for each object contained in at least one of the core meaning and raw response: determining whether the object is new or whether the object has been encountered before by the target personality; upon determining that the object has been encountered before: updating the object file associated with the object as needed with any relevant information contained in at least one of the core meaning and raw response; and upon determining that the object is new: creating a new object file for the object; populating the new object file with any relevant information contained in at least one of the core meaning and raw response; and upon determining that the object is a subset of a pre-existing object, populating at least one of the object taxonomy and object attribute of the new object file with all relevant information associated with the pre-existing object.

11. The method according to embodiments 1-10, further comprising the steps of: creating and maintaining an object file for each of the at least one communicating entity; and upon the target personality receiving an initial conversational input from a one of the at least one communicating entity: determining whether the communicating entity has been encountered before by the target personality; upon determining that the communicating entity is new: creating a new object file for the communicating entity; prompting the communicating entity for relevant information related to said entity; and populating the new object file with any relevant information obtained from the communicating entity; upon determining that the communicating entity has been encountered before: accessing the object file associated with the communicating entity; and verifying the identity of the communicating entity; and updating the object file associated with the communicating entity as needed with any relevant information contained in at least one conversational input.

12. The method according to embodiments 1-11, wherein the step of verifying the identity of the communicating entity further comprises the step of prompting the communicating entity with an at least one validation question based on at least one of the relevant information contained in the associated object file and details contained in past conversations between the target personality and the communicating entity.

13. The method according to embodiments 1-12, further comprising the steps of: encrypting the relevant information contained in the at least one object file associated with the at least one communicating entity using a unique encryption key; upon verifying the identity of the communicating entity, determining whether the communicating entity is in possession of a corresponding decryption key; and using the decryption key to decrypt the relevant information contained in the associated object file in order to utilize that information as appropriate while interacting with the communicating entity.

14. The method according to embodiments 1-13, further comprising the step of providing at least one of the target personality and conversational personality access to one or more supplemental data sources for selectively increasing the knowledge base of said personality.

15. The method according to embodiments 1-14, further comprising the steps of, upon the target personality receiving a conversational input having a response that requires research: transmitting a non-committal response to the communicating entity and continuing the conversation therewith; initiating a second thread for performing the necessary research via the supplemental data sources; and upon concluding the research, interrupting the conversation and transmitting the researched response to the communicating entity.

16. A method for creating and implementing an artificially intelligent agent residing in memory on an at least one computing device and configured for taking appropriate action in response to an at least one conversational input, the method comprising the steps of: implementing a target personality of the agent in memory on the at least one computing device; implementing an at least one artificially intelligent conversational personality in memory on the at least one computing device, each conversational personality configured for conversing with the target personality as needed in order to provide the target personality with appropriate knowledge and associated responses; implementing an at least one teacher personality in memory on the at least one computing device, each teacher personality configured for functioning as a communicating entity by transmitting to the target personality a set of pre-defined conversational inputs so that the target personality may learn how to appropriately respond to the conversational inputs through interacting with and receiving appropriate responses from the at least one conversational personality; allowing an at least one communicating entity to interact with the target personality by receiving the at least one conversational input from the communicating entity; and for each conversational input received by the target personality: processing the conversational input to derive an at least one core meaning associated therewith; determining an appropriate raw response for the at least one core meaning; formatting the raw response; and transmitting the formatted response to the communicating entity; whereby, the target personality of the agent is capable of carrying on a conversation, even if one or more responses provided by the target personality are obtained in real-time from the at least one conversational personality, all while dynamically increasing the artificial intelligence of the target personality.

17. A system for creating and implementing an artificially intelligent agent residing in memory on an at least one computing device, the system comprising: a target personality residing in memory on the at least one computing device and comprising a pre-processor, a logic processor, and a post-processor, the target personality configured for interacting with an at least one communicating entity through responding to an at least one conversational input received therefrom; the pre-processor configured for processing each conversational input to derive an at least one core meaning associated therewith; the logic processor configured for determining an appropriate raw response for the at least one core meaning; the post-processor configured for formatting the raw response; an at least one artificially intelligent conversational personality residing in memory on the at least one computing device, each conversational personality configured for conversing with the target personality as needed in order to provide the target personality with appropriate knowledge and associated responses; an at least one teacher personality residing in memory on the at least one computing device, each teacher personality configured for transmitting to the target personality a set of pre-defined conversational inputs so that the target personality may learn how to appropriately respond to the conversational inputs through interacting with and receiving appropriate responses from the at least one conversational personality; wherein, upon the target personality receiving said at least one conversational input, the target personality is configured for: for each conversational input received by the target personality: processing the conversational input to derive an at least one core meaning associated therewith; determining an appropriate raw response for the at least one core meaning; formatting the raw response; and transmitting the formatted response to the communicating entity; whereby, the target personality is capable of carrying on a conversation, even if one or more responses provided by the target personality are obtained in real-time from the at least one conversational personality, all while dynamically increasing the artificial intelligence of the target personality.

18. The system according to embodiment 17, wherein the system is further configured for: choosing a desired personality type for the target personality; and selecting one or more appropriate conversational personalities with which the target personality should communicate, based on the desired personality type for the target personality.

19. The system according to embodiments 17-18, wherein the system is further configured for selecting an appropriate teacher personality with which the target personality should communicate, based on the desired personality type for the target personality.

20. The system according to embodiments 17-19, wherein the at least one communicating entity is a human user.

21. The system according to embodiments 17-20, wherein the system is further configured for: maintaining a relational list of all conversational inputs encountered by the target personality along with the core meanings associated with each such conversational input; removing any punctuation from the conversational input; removing any language from the conversational input that is determined to have no bearing on the core meaning; and mapping the conversational input to the associated core meaning stored in the relational list.

22. The system according to embodiments 17-21, wherein the system is further configured for, for each core meaning associated with the conversational input: upon determining that the core meaning contains an at least one object, processing said at least one object; maintaining a set of response files containing all core meanings encountered by the target personality along with the raw responses associated with each such core meaning; determining whether the core meaning is new or whether the core meaning has been encountered before by the target personality; upon determining that the core meaning has been encountered before: mapping the core meaning to the at least one associated raw response stored in the response files; and determining which of the at least one associated raw response is the most appropriate; and upon determining that the core meaning is new: transmitting the core meaning to the at least one conversational personality; receiving an at least one raw response from the conversational personality; determining which of the at least one raw response is the most appropriate; adding the core meaning and associated raw response deemed most appropriate to the response files; and upon determining that the raw response contains an at least one object, processing said at least one object.

23. The system according to embodiments 17-22, wherein the system is further configured for: storing in the set of response files a mood value associated with each raw response, said mood value indicating the type of emotion that is to accompany the associated raw response; and modifying the raw response to reflect the type of emotion defined by the mood value.

24. The system according to embodiments 17-23, wherein the system is further configured for: storing in the set of response files a weight value associated with the mood value of each raw response, said weight value indicating the strength of appropriate mood that is to accompany the associated raw response; and modifying the raw response to reflect the strength of appropriate mood defined by the weight value.

25. The system according to embodiments 17-24, wherein the system is further configured for: assigning a rank to each communicating entity and conversational personality; in each response file, storing information related to the communicating entity or conversational personality responsible for creating or last editing the raw response contained in said response file, said information including the rank; and upon discovering multiple raw responses associated with a given core meaning, determining which of said raw responses has the highest rank associated therewith.

26. The system according to embodiments 17-25, wherein the system is further configured for: maintaining a set of object files containing information associated with all objects encountered by the target personality, each object file containing at least one of an object name, an object taxonomy, and an object attribute; and for each object contained in at least one of the core meaning and raw response: determining whether the object is new or whether the object has been encountered before by the target personality; upon determining that the object has been encountered before: updating the object file associated with the object as needed with any relevant information contained in at least one of the core meaning and raw response; and upon determining that the object is new: creating a new object file for the object; populating the new object file with any relevant information contained in at least one of the core meaning and raw response; and upon determining that the object is a subset of a pre-existing object, populating at least one of the object taxonomy and object attribute of the new object file with all relevant information associated with the pre-existing object.

27. The system according to embodiments 17-26, wherein the system is further configured for: creating and maintaining an object file for each of the at least one communicating entity; and upon the target personality receiving an initial conversational input from a one of the at least one communicating entity: determining whether the communicating entity has been encountered before by the target personality; upon determining that the communicating entity is new: creating a new object file for the communicating entity; prompting the communicating entity for relevant information related to said entity; and populating the new object file with any relevant information obtained from the communicating entity; upon determining that the communicating entity has been encountered before: accessing the object file associated with the communicating entity; and verifying the identity of the communicating entity; and updating the object file associated with the communicating entity as needed with any relevant information contained in at least one conversational input.

28. The system according to embodiments 17-27, wherein the system is further configured for prompting the communicating entity with an at least one validation question based on at least one of the relevant information contained in the associated object file and details contained in past conversations between the target personality and the communicating entity.

29. The system according to embodiments 17-28, wherein the system is further configured for: encrypting the relevant information contained in the at least one object file associated with the at least one communicating entity using a unique encryption key; upon verifying the identity of the communicating entity, determining whether the communicating entity is in possession of a corresponding decryption key; and using the decryption key to decrypt the relevant information contained in the associated object file in order to utilize that information as appropriate while interacting with the communicating entity.

30. The system according to embodiments 17-29, wherein the system is further configured for providing at least one of the target personality and conversational personality access to one or more supplemental data sources for selectively increasing the knowledge base of said personality.

31. The system according to embodiments 17-30, wherein the system is further configured for, upon the target personality receiving a conversational input having a response that requires research: transmitting a non-committal response to the communicating entity and continuing the conversation therewith; initiating a second thread for performing the necessary research via the supplemental data sources; and upon concluding the research, interrupting the conversation and transmitting the researched response to the communicating entity.

In closing, regarding the exemplary embodiments of the present invention as shown and described herein, it will be appreciated that systems and methods for creating and implementing an artificially intelligent agent or system are disclosed. Because the principles of the invention may be practiced in a number of configurations beyond those shown and described, it is to be understood that the invention is not in any way limited by the exemplary embodiments, but is generally directed to systems and methods for creating and implementing an artificially intelligent agent or system and is able to take numerous forms to do so without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for creating and implementing an artificially intelligent agent residing in memory on an at least one computing device and configured for taking an action in response to an at least one conversational input, the method comprising the steps of:

implementing a target personality of the agent in memory on the at least one computing device;

implementing an at least one artificially intelligent conversational personality in memory on the at least one computing device, each conversational personality configured for conversing with the target personality as needed in order to provide the target personality with knowledge and associated responses;

allowing an at least one communicating entity to interact with the target personality by receiving the at least one conversational input from the communicating entity; and for each conversational input received by the target personality:

processing the conversational input to derive an at least one core meaning associated therewith;

determining a raw response corresponding to each core meaning associated with the conversational input by:

determining that the core meaning contains an at least one object, processing said at least one object;

maintaining a set of response files containing all core meanings encountered by the target personality along with the raw responses associated with each such core meaning;

determining whether the core meaning is new or whether the core meaning has been encountered before by the target personality;

upon determining that the core meaning has been encountered before:

mapping the core meaning to the at least one associated raw response stored in the response files; and determining which of the at least one associated raw response is the most appropriate; and upon determining that the core meaning is new:

transmitting the core meaning to the at least one conversational personality;

receiving an at least one raw response from the conversational personality;

determining which of the at least one raw response is the most appropriate;

adding the core meaning and associated raw response deemed most appropriate to the response files; and upon determining that the raw response contains an at least one object, processing said at least one object;

whereby, the target personality of the agent is capable of carrying on a conversation, even if one or more responses provided by the target personality are obtained in real-time from the at least one conversational personality, all while dynamically increasing the artificial intelligence of the target personality.

2. The method of claim 1, further comprising the steps of:

choosing a desired personality type for the target personality; and selecting one or more appropriate conversational personalities with which the target personality should communicate, based on the desired personality type for the target personality.

3. The method of claim 2, wherein the step of allowing an at least one communicating entity to interact with the target personality further comprises the steps of:

implementing an at least one teacher personality in memory on the at least one computing device, each teacher personality configured for transmitting to the target personality a set of pre-defined conversational inputs so that the target personality may learn how to appropriately respond to the conversational inputs through interacting with and receiving appropriate responses from the at least one conversational personality; and selecting an appropriate teacher personality with which the target personality should communicate, based on the desired personality type for the target personality.

4. The method of claim 1, wherein the step of allowing an at least one communicating entity to interact with the target personality further comprises the step of allowing an at least one human user to selectively transmit to the target personality the at least one conversational input.

5. The method of claim 1, wherein the step of processing the conversational input further comprises the steps of:

maintaining a relational list of all conversational inputs encountered by the target personality along with the core meanings associated with each such conversational input;

removing any punctuation from the conversational input;

removing any language from the conversational input that is determined to have no bearing on the core meaning; and mapping the conversational input to the associated core meaning stored in the relational list.

6. The method of claim 1, further comprising the steps of:

storing in the set of response files a mood value associated with each raw response, said mood value indicating the type of emotion that is to accompany the associated raw response; and modifying the raw response to reflect the type of emotion defined by the mood value.

7. The method of claim 6, further comprising the steps of:

storing in the set of response files a weight value associated with the mood value of each raw response, said weight value indicating the strength of appropriate mood that is to accompany the associated raw response; and modifying the raw response to reflect the strength of appropriate mood defined by the weight value.

8. The method of claim 1, wherein the step of determining which of the at least one raw response is the most appropriate further comprises the steps of:

assigning a rank to each communicating entity and conversational personality;

in each response file, storing information related to the communicating entity or conversational personality responsible for creating or last editing the raw response contained in said response file, said information including the rank; and upon discovering multiple raw responses associated with a given core meaning, determining which of said raw responses has the highest rank associated therewith.

9. The method of claim 1, wherein the step of processing the at least one object further comprises the steps of:

maintaining a set of object files containing information associated with all objects encountered by the target personality, each object file containing at least one of an object name, an object taxonomy, and an object attribute; and for each object contained in at least one of the core meaning and raw response:

determining whether the object is new or whether the object has been encountered before by the target personality;

upon determining that the object has been encountered before:

updating the object file associated with the object as needed with any relevant information contained in at least one of the core meaning and raw response; and upon determining that the object is new:

creating a new object file for the object;

populating the new object file with any relevant information contained in at least one of the core meaning and raw response; and upon determining that the object is a subset of a pre-existing object, populating at least one of the object taxonomy and object attribute of the new object file with all relevant information associated with the pre-existing object.

10. The method of claim 9, further comprising the steps of:

creating and maintaining an object file for each of the at least one communicating entity; and upon the target personality receiving an initial conversational input from a one of the at least one communicating entity:

determining whether the communicating entity has been encountered before by the target personality;

upon determining that the communicating entity is new:

creating a new object file for the communicating entity;

prompting the communicating entity for relevant information related to said entity; and populating the new object file with any relevant information obtained from the communicating entity;

upon determining that the communicating entity has been encountered before:

accessing the object file associated with the communicating entity; and verifying the identity of the communicating entity; and updating the object file associated with the communicating entity as needed with any relevant information contained in at least one conversational input.

11. The method of claim 10, wherein the step of verifying the identity of the communicating entity further comprises the step of prompting the communicating entity with an at least one validation question based on at least one of the relevant information contained in the associated object file and details contained in past conversations between the target personality and the communicating entity.

12. The method of claim 10, further comprising the steps of:

encrypting the relevant information contained in the at least one object file associated with the at least one communicating entity using a unique encryption key;

upon verifying the identity of the communicating entity, determining whether the communicating entity is in possession of a corresponding decryption key; and using the decryption key to decrypt the relevant information contained in the associated object file in order to utilize that information as appropriate while interacting with the communicating entity.

13. The method of claim 1, further comprising the step of providing at least one of the target personality and conversational personality access to one or more supplemental data sources for selectively increasing the knowledge base of said personality.

14. The method of claim 13, further comprising the steps of, upon the target personality receiving a conversational input having a response that requires research:

transmitting a non-committal response to the communicating entity and continuing the conversation therewith;

initiating a second thread for performing the necessary research via the supplemental data sources; and upon concluding the research, interrupting the conversation and transmitting the researched response to the communicating entity.

15. A method for creating and implementing an artificially intelligent agent residing in memory on an at least one computing device and configured for taking an action in response to an at least one conversational input, the method comprising the steps of:

implementing a target personality of the agent in memory on the at least one computing device;

implementing an at least one artificially intelligent conversational personality in memory on the at least one computing device, each conversational personality configured for conversing with the target personality as needed in order to provide the target personality with knowledge and associated responses;

allowing an at least one communicating entity to interact with the target personality by receiving the at least one conversational input from the communicating entity;

implementing an at least one teacher personality in memory on the at least one computing device, each teacher personality configured for functioning as a communicating entity by transmitting to the target personality a set of pre-defined conversational inputs so that the target personality may learn how to appropriately respond to the conversational inputs through interacting with and receiving appropriate responses from the at least one conversational personality; and for each conversational input received by the target personality:

processing the conversational input to derive an at least one core meaning associated therewith;

determining a raw response corresponding to each core meaning associated with the conversational input by:

determining that the core meaning contains an at least one object, processing said at least one object;

maintaining a set of response files containing all core meanings encountered by the target personality along with the raw responses associated with each such core meaning;

determining whether the core meaning is new or whether the core meaning has been encountered before by the target personality;

upon determining that the core meaning has been encountered before:

mapping the core meaning to the at least one associated raw response stored in the response files; and determining which of the at least one associated raw response is the most appropriate; and upon determining that the core meaning is new:

transmitting the core meaning to the at least one conversational personality;

receiving an at least one raw response from the conversational personality;

determining which of the at least one raw response is the most appropriate;

adding the core meaning and associated raw response deemed most appropriate to the response files; and upon determining that the raw response contains an at least one object, processing said at least one object;

whereby, the target personality of the agent is capable of carrying on a conversation, even if one or more responses provided by the target personality are obtained in real-time from the at least one conversational personality, all while dynamically increasing the artificial intelligence of the target personality.

16. A system for creating and implementing an artificially intelligent agent residing in memory on an at least one computing device, the system comprising:

a target personality residing in memory on the at least one computing device and comprising a pre-processor, a logic processor, and a post-processor, the target personality configured for interacting with an at least one communicating entity through responding to an at least one conversational input received therefrom;

the pre-processor configured for processing each conversational input to derive an at least one core meaning associated therewith;

the logic processor configured for determining a corresponding raw response for the at least one core meaning;

the post-processor configured for formatting the raw response;

an at least one artificially intelligent conversational personality residing in memory on the at least one computing device, each conversational personality configured for conversing with the target personality as needed in order to provide the target personality with knowledge and associated responses;

an at least one teacher personality residing in memory on the at least one computing device, each teacher personality configured for transmitting to the target personality a set of pre-defined conversational inputs so that the target personality may learn how to respond to the conversational inputs through interacting with and receiving corresponding responses from the at least one conversational personality;

wherein, upon the target personality receiving said at least one conversational input, the target personality is configured for:

for each conversational input received by the target personality:

processing the conversational input to derive an at least one core meaning associated therewith;

determining a raw response corresponding to each core meaning associated with the conversational input by:

determining that the core meaning contains an at least one object, processing said at least one object;

maintaining a set of response files containing all core meanings encountered by the target personality along with the raw responses associated with each such core meaning;

determining whether the core meaning is new or whether the core meaning has been encountered before by the target personality;

upon determining that the core meaning has been encountered before:

mapping the core meaning to the at least one associated raw response stored in the response files; and determining which of the at least one associated raw response is the most appropriate; and upon determining that the core meaning is new:

transmitting the core meaning to the at least one conversational personality;

receiving an at least one raw response from the conversational personality;

determining which of the at least one raw response is the most appropriate;

adding the core meaning and associated raw response deemed most appropriate to the response files; and upon determining that the raw response contains an at least one object, processing said at least one object;

whereby, the target personality is capable of carrying on a conversation, even if one or more responses provided by the target personality are obtained in real-time from the at least one conversational personality, all while dynamically increasing the artificial intelligence of the target personality.

* * * * *